July 2, 1963  C. A. AMANN ETAL  3,095,700
REGENERATIVE GAS TURBINE
Original Filed Jan. 16, 1956  2 Sheets-Sheet 1

INVENTORS
Charles A. Amann,
John S. Collman,
Roger W. Haushalter,
James M. Ricketts,
William A. Turunen &
Paul I. Vickers
BY Paul Fitzpatrick
ATTORNEY July 2, 1963  C. A. AMANN ETAL  3,095,700
REGENERATIVE GAS TURBINE
Original Filed Jan. 16, 1956  2 Sheets-Sheet 2
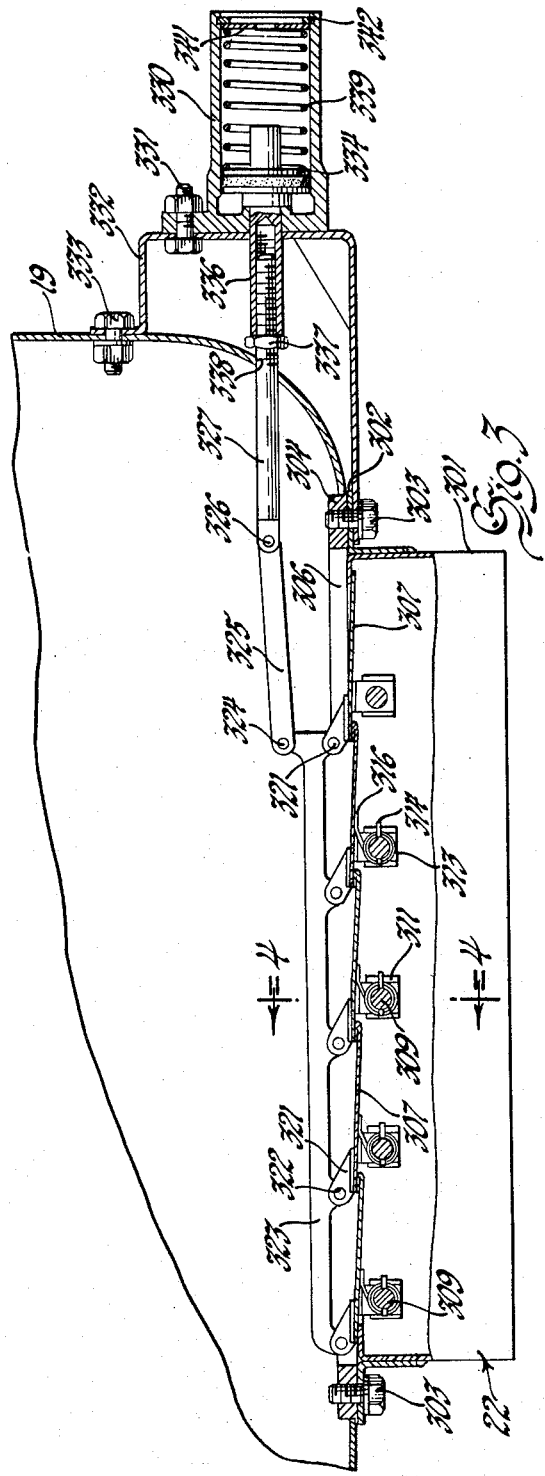
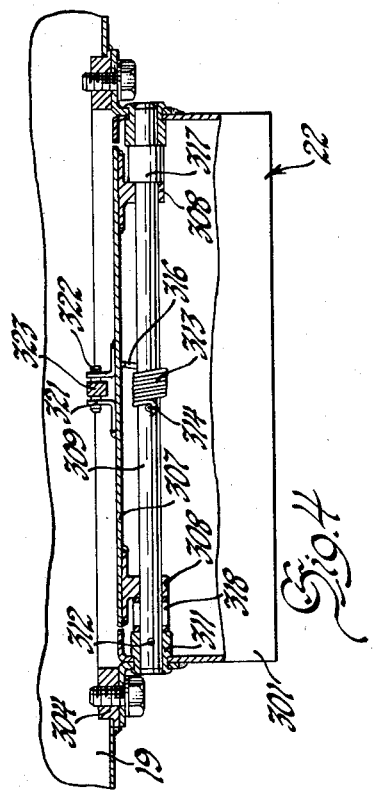
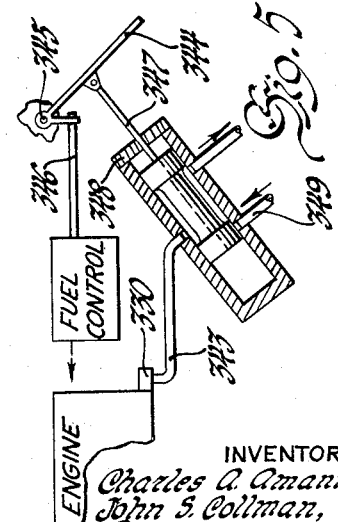
INVENTORS
Charles A. Amann,
John S. Collman,
Roger W. Haushalter,
James M. Ricketts,
William A. Turunen,
BY & Paul T. Vickers
Paul Fitzpatrick
ATTORNEY

United States Patent Office 3,095,700
Patented July 2, 1963

3,095,700
REGENERATIVE GAS TURBINE
Charles A. Amann, Birmingham, John S. Collman, Detroit, Roger W. Haushalter, St. Clair Shores, James M. Ricketts, Oxford, William A. Turunen, Birmingham, and Paul T. Vickers, Royal Oak, Mich., assignors to General Motors Corporation, Detroit, Mich., a corporation of Delaware
Original application Jan. 16, 1956, Ser. No. 559,475. Divided and this application Jan. 20, 1960, Ser. No. 3,556
1 Claim. (Cl. 60—39.2)

This application is a division of our application Serial No. 559,475 filed January 16, 1956, now abandoned.

This invention relates to gas turbine engines and is particularly directed to the provision of an engine installation suitable for automotive power installations and the like.

The general nature of the engine may be understood from the following brief description. It comprises a gas generator made up of a compressor, combustion apparatus, and a turbine driving the compressor. Associated with the compressor turbine is a power turbine driven by the combustion products. The engine is of a regenerative type with rotary regenerators which extract heat from the power turbine exhaust gas and transfer the heat to the air flowing from the compressor to the combustion apparatus to provide relatively high efficiency and a cool exhaust, both of which are highly desirable.

An advantageous feature of the engine, to accommodate it to passenger vehicles, is the novel exhaust system. Because of the large quantity of air handled by a gas turbine, the provision of adequate exhaust ducting in an automobile has been believed to be impracticable. In this engine, two small exhausts are provided which can be connected to exhaust pipes leading to the rear of the car and which are adequate to handle the air flow when the engine is idling without excessive back pressure. In addition, larger exhaust openings from the engine directly to atmosphere under the car are provided which may be opened when substantial power is required from the engine.

Figure 1:
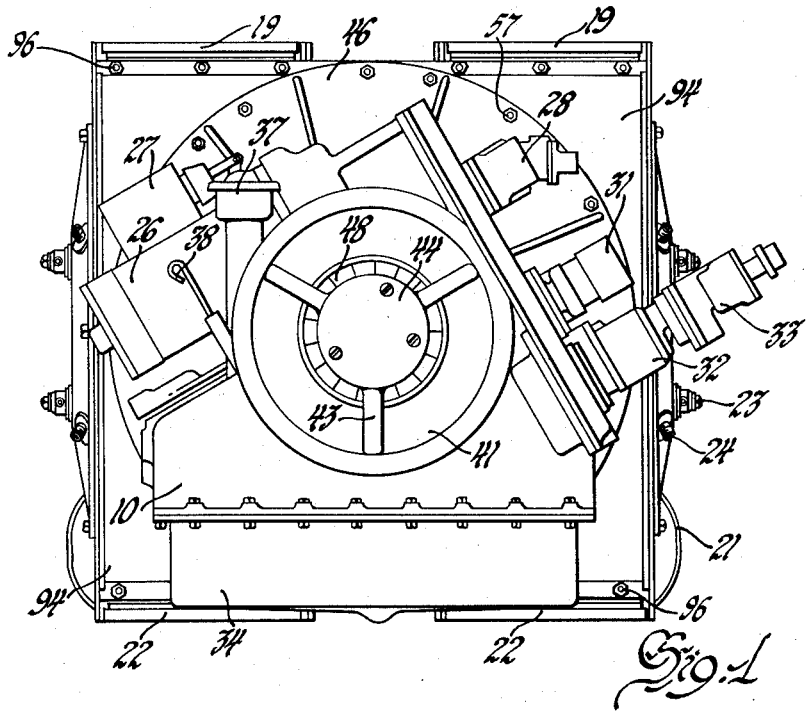
Figure 2:
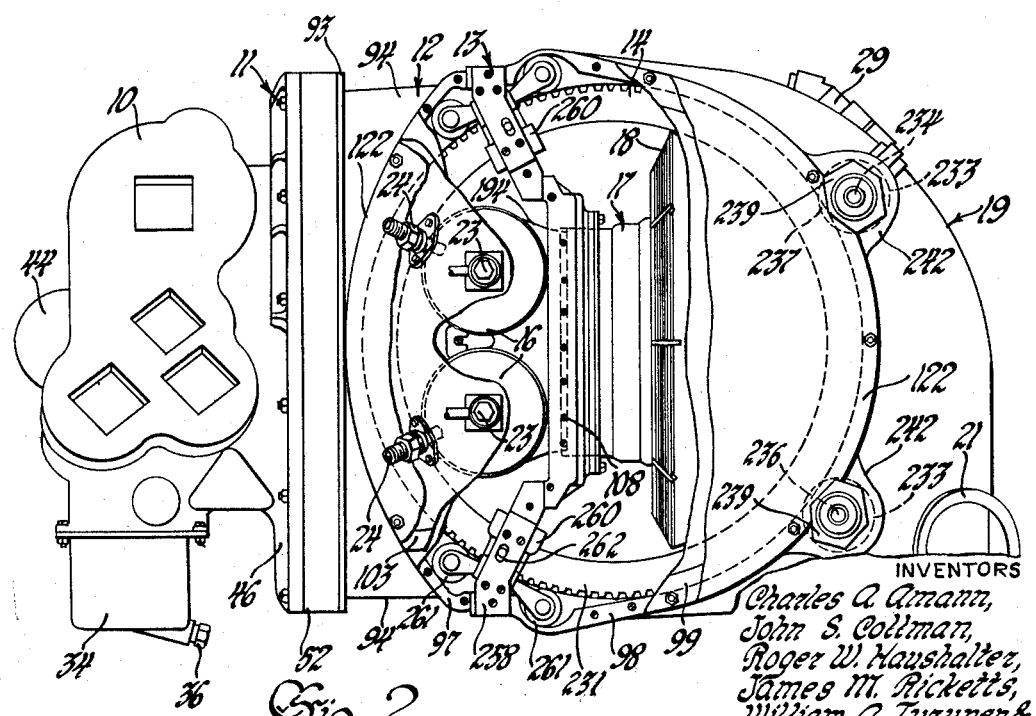

The nature of the invention and its advantages will be fully apparent from the succeeding detailed description of the preferred embodiment thereof and the accompanying drawings in which:

FIGURE 1 is a front elevation view of the engine;
FIGURE 2 is a side elevation with certain accessories removed and with parts cut away;
FIGURE 3 is a partial view taken in vertical longitudinal section through a main exhaust;
FIGURE 4 is a sectional view of the same taken on the plane indicated by the line 4—4 in FIGURE 3; and
FIGURE 5 is a schematic diagram of an exhaust control.

General Description

Referring first to FIGURES 1 and 2 for a general description of the engine, the major parts are an accessory drive case 10, a compressor 11, an engine case or regenerator housing 12, a diaphragm or bulkhead 13 which divides the space within the regenerator housing into first and second chambers before and behind the bulkhead, a drum-shaped regenerator matrix 14 on each side of the engine, two combustion chambers 16 at each side of the engine, and a turbine 17. The turbine includes two independently rotating or gas-coupled turbine wheels, one of which drives the compressor which supplies compressed air through the regenerator matrices to the combustion chambers, from which motive fluid passes through the turbine. The other turbine wheel is coupled to a power output shaft. The turbine exhaust discharges through an annular diffuser 18 and flows through the regenerator matrices into exhaust collectors 19 at the rear of the engine at each side. An exhaust connection 21 is provided from each exhaust collector 19. Main exhaust outlets 22 are provided in the bottoms of the exhaust collectors 19. Fuel is supplied to the combustion chambers 16 by fuel nozzles 23 and ignited by an igniter 24 for each chamber.

The accessory case 10 provides a mounting for engine accessories which are driven by the compressor turbine through gearing which may be conventional and is not shown, since it is immaterial to the invention. FIGURE 2 shows the accessory case without the accessories while FIGURE 1 shows them in position for identification. The accessories include a starter 26 which may be coupled to the engine by a solenoid 27. An oil pump 28 supplies oil under pressure to a hydraulic regenerator drive motor 29. A tachometer generator 31 is coupled to a speed indicator (not shown). A fuel pump 32 and a governor 33 mounted one above the other are also driven by the gearing. An oil pan or sump 34 bolts to the bottom of the accessory case and is provided with a drain 36. Lubricating oil pumps (not shown) mounted in the accessory drive case draw oil from the sump for lubrication. Since the lubricating system is immaterial to the invention, a description thereof is omitted in the interest of conciseness. Oil may be supplied through a filler tube and breather pipe 37 and the level may be checked by a dip stick 38.

The accessory case 10 defines a converging annular air inlet 41 within which is a shaft housing supported by three struts 43. A streamlined cap or fairing 44 is bolted to the front of the shaft housing. The accessory case casting comprises a ribbed circular radial flange 46 at the rear thereof which defines the front case of a centrifugal compressor which discharges through an annular opening in a flange 52. The compressor requires no explanation, since it is merely an example of the known centrifugal type of compressor. The compressor and the turbine which drives it are supported in a frame (not illustrated) integral with flange 52.

Considering now the outer case of the engine which serves as the regenerator housing, the outer margin of the flange 52 of the engine frame and compressor outlet casting bolts to the front flange 93 of a sheet metal front cover 94 which is circular in cross section at the forward end and rectangular at the rear end. The front cover has rear flanges at the top and bottom of the engine which are fixed to the top and bottom edges of the bulkhead 13 by bolts 96. The side bolting flange 97 of the front cover is arcuate, being disposed slightly outside the margin of the regenerator drums 14 to provide the forward edge of openings in the side of the engine through which the drums may be installed and removed. The rear part of the edge of this opening is defined by the outside bolting flanges 98 of the exhaust collectors 19 which provide the rear part of the regenerator housing. There is an exhaust collector at each side of the engine, as will be most clearly apparent from FIGURE 1. An approximately circular regenerator cover 99 is bolted onto the flanges 97 and 98. This cover comprises a plate defining the margins of the cover and having an opening in the forward part thereof normally closed by a combustion chamber cover 103 which may be removed to provide access to the combustion chambers 16. The forward edge of the combustion chamber cover together with the forward edge of the regenerator cover 99 are bolted to the flange 97 of the front cover. The rear edge of the combustion chamber cover 103, and the cover 99, overlie the side edges of the bulkhead 13 to which they are fixed by nuts on studs 108.

The rear of the engine housing between the exhaust collectors 19 is closed by a rear cover (not illustrated) which comprises a part cylindrical plate which follows the outline of the regenerator drums from the lower edge of the bulkhead to the upper edge of the bulkhead. The forward edges of the rear cover and the exhaust collectors have stiffening flanges which are secured to the edges of the bulkhead by the bolts 96. The side flanges of the rear cover bolt to the inner side margins of the exhaust collectors 19.

Summarizing the engine housing, it will be seen that the front of the engine case or regenerator housing is defined by the rear flange 46 of the compressor, the front flange 52 of the engine frame, and the front cover 94. The sides of the housing are defined by the regenerator covers 99, the combustion chamber covers 103, and the outside faces of the exhaust collectors 19. The top, rear and bottom of the engine rearwardly of the bulkhead 13 is enclosed by the exhaust collectors 19 at each side and the rear cover in the center.

A radiation shield 122 which is generally coextensive with the regenerator cover and spaced outwardly therefrom is mounted on each side of the engine.

The present application is not directed to the structure of the turbine 17 as such, which is the subject matter of U.S. Patent No. 2,960,306.

The turbine exhausts into the annular diffuser 18 which serves to diffuse the turbine exhaust and distribute it throughout the chamber between the bulkhead 13 and the regenerator matrix 14, thus preventing an undue concentration of flow through the matrix in the immediate region of the turbine exhaust.

The turbine drives a power output shaft and reduction gearing (not illustrated) mounted between the exhaust collectors 19.

The combustion apparatus shown in FIGURE 2 comprises two horizontal combustion chambers 16 on each side through which gas flows inwardly toward the center of the engine. The combustion chambers are of known type. The inner or discharge end of each combustion chamber fits slidably into one of two entrances of a burner transition section 194. One of these transition sections is provided at each side of the engine. They are of such form as to conduct the flow from the two adjacent entrances 193 into a semi-annular discharge section which supplies the turbine. As will be apparent, therefore, the two discharge sections cover the entire area of the turbine nozzle.

As will be apparent, the combustion chambers receive air which has been discharged from the compressor and has been heated by flowing through the regenerator matrix 14. Fuel injected by the nozzles 23 and initially ignited by the spark plugs 24 burns in the chambers, the combustion gases being diluted by air entering the combustion chambers, and flowing through the transition sections into the compressor turbine and on through the power turbine. The turbine exhaust, after deflection by the diffuser 18, flows outwardly through the rear part of the matrix into the exhaust collectors 19 and to the exhausts 21 and 22.

The regenerator as such is the subject of application No. 559,390, Rotary Regenerator, filed January 16, 1956, and the regenerator matrix preferably is of the type disclosed and claimed in U.S. Patent No. 2,937,010, and it is unnecessary to describe these structures in detail. Each regenerator matrix 14 comprises porous heat exchange material mounted between two end rings 231. A ring gear is fixed on each of the end rings. The matrix provides a rigid structure with the faces of the rings 231 defining a smooth continuous edge for the matrix and the peripheries of the rings providing a surface which may be supported and guided by rollers.

The rims 231 bear against rollers 233 mounted on an upper shaft at 234 and a lower shaft at 236. The upper shaft also bears matrix driving gears 237 keyed to the shaft. These shafts are rotatably supported in bearings mounted in cages 239 secured to ears or extensions 242 of the side flanges of each exhaust collector 19. Hydraulic motor 29 rotates the matrices 14 at low speed.

The regenerator diaphragm or bulkhead 13 is connected at the top, bottom, and sides to the outer case or regenerator housing and has a central opening through which the turbine case extends, the case being bolted to the bulkhead. The bulkhead provides four slots or openings for mounting main seals 260 which seal the matrices where they pass through the bulkhead. The outside ends of the seal openings are connected by end caps 258 which may be removed to permit installation or removal of the regenerator drum 14 and main seals 260.

Each main seal 260 has mounted thereon rollers 261 which ride on the rim 231 of the matrix and has trunnions 262 extending from it which can move radially to a limited extent in slots in the fixed structure. Rim seals engaging the edges of the matrix are necessary to prevent bypassing. There are provided, therefore, four rings of contact seals (not illustrated), engaging each edge of both drums.

The bulkhead assembly 13 divides the space within the matrices into a forward and a rear chamber and prevents flow between these, except for incidental leakage and a small amount of gas carried through the seal by the matrix. Thus, from a functional standpoint, the regenerator provides four spaces. The first is a cool gas space ahead of the matrix, supplied with air by the compressor. This air is constrained by the seals to flow through the matrix into a second or hot air space between the forward part of the matrix and the bulkhead, within which the combustion chambers 16 are mounted. This air, after heating in the combustion chambers, flows through the turbine into a third or hot gas space between the bulkhead and the rear part of the matrix. The rim seals force this hot turbine exhaust gas to flow outwardly through the matrix into the exhaust collectors, which define a fourth or cool gas space. The hot gas flowing through the matrix heats the matrix, which is rotated slowly and gives up heat to the air flowing from the first to the second space.

The gas pressure on the matrix when the engine is operating presses the matrix against the support rollers 233 at the rear of the engine, so that these support the matrix.

*Exhaust System*

It is not feasible in an automobile of usual configuration to provide ducting of sufficient capacity to carry the exhaust to the rear of the car. However, it is undesirable to vent the engine exhaust at the front of the car under all conditions. The feature of the engine to which this application is directed is that there is an exhaust system similar to that employed with reciprocating engines for disposing of the exhaust under idling conditions when the vehicle is stationary and, in addition, a main exhaust at the engine which is opened only when the engine is generating power, which implies that the vehicle is moving and, therefore, there will be sufficient movement of air under the vehicle to carry the exhaust away.

Referring to FIGURES 1 and 2, an idling exhaust outlet 21 is provided from each exhaust collector which may be connected to an exhaust pipe (not shown) running to the rear of the vehicle, as usual, which may be of such dimensions that it may be installed in a vehicle of generally conventional structure. The area of this is sufficient to carry the exhaust gases without excessive back pressure under relatively low volume conditions which obtain when the engine is idling. A main exhaust 22 (FIGURES 3 to 5) of much larger area is provided in the bottom of each exhaust collector. A short rectangular shield or box 301 open at both ends has a flange 302 at the top which is fixed by bolts 303 to a bolting flange 304 welded in the bottom of the exhaust collector 19 and defining an exhaust opening 306. This opening is closed under idling conditions by a number of overlapping louvers 307 which are welded to lugs 308, rotatable on rods 309 mounted in bosses 311 in the side walls of the box 301 and held against rotation by pins 312. The louvers are urged toward closed position by coil torsion springs 313, one end 314 of which is hooked over a pin passed through a hole in the rod 309, and the other end 316 of which bears against the under surface of the louver plate 307. A spacing sleeve 317 is mounted between the lugs 308 and one of the bosses 311. A C-shaped spring 318 having holes through which the rod 309 passes is mounted between the other lug 308 and boss 311. This spring urges the louver to the right as viewed in FIGURE 4 against the sleeve 317.

Each louver plate has welded thereto two arms 321 for actuation of the louvers. These arms are coupled by pins 322 to an actuating rod 323. The actuating rod is coupled by pin 324, link 325, and pin 326 to a pull rod 327 which may be actuated to open the louvers.

Actuating rod 327 is coupled to a small hydraulic cylinder 330 having ears secured by bolts 331 to a mounting bracket 332 fixed to the wall of the exhaust collector 19 by a bolt 333 and some of cap screws 303. A piston 334 in the cylinder is integral with a rod 336 into the end of which the pull rod 327 is threaded. A jam nut 337 fixes the adjustment of the pull rod in the piston rod. The pull rod passes through a small hole 338 in the wall of the exhaust collector. The piston is urged to the left as viewed in FIGURE 5 by coil spring 339 engaging the piston and a spring retainer and piston stop plate 341 which is held in place by a snap ring 342. Oil or other motive fluid under pressure may be admitted to the left face of the piston through a pressure fluid connection 343 (FIGURE 5).

The cylinders 330 are supplied with fluid to open the exhausts 22 when the power setting of the engine is advanced above idling. While numerous arrangements may be adopted for this purpose, a simple and feasible one is illustrated schematically in FIGURE 5. A foot throttle 344 swingably mounted on a pivot 345 is coupled through push rod 346 to a fuel control which determines the engine power output. Foot throttle 344 is also coupled through rod 347 to the movable member of a standard spool valve 348 which couples the supply conduit 343 to the cylinders 330 to a source of actuating oil such as hydraulic pump 28 and to a fluid return line. The supply and return lines to the valve are indicated by the arrows. When the throttle is in idling position, the cylinders 330 are vented. When the throttle is depressed, the vent line is closed and the pressure line 349 is connected through line 343 to the cylinders.

Preferably, the strength of springs 313 and 339 is such relative to the area of the louver plates 307 that, even with the cylinders 330 vented, any significant gas pressure will hold the louvers open. Thus, if the throttle is closed, the louvers will remain open and prevent excessive back pressure until the engine has decelerated to idling speed and gas flow conditions.

It would be possible, of course, to dispense with the cylinders 330 and depend solely upon the gas pressure in the exhaust collector 19 to open the louvers, but this would result in some undesirable back pressure under normal running conditions.

Any suitable exhaust ducting extending to the rear of the car may be connected to the outlets 21. U.S. Patent No. 2,875,841 shows dual exhaust ducts which might be used with this engine.

It will be noted that many details of the engine, which are believed to be immaterial to an understanding of this invention, have been omitted from this specification. If required, reference may be made to the applications referred to above for further details of the preferred environment of the invention.

The detailed description of the preferred embodiment of the invention for the purpose of explaining the principles thereof is not to be construed as limiting or restricting the invention, as many modifications may be made by the exercise of skill in the art within the scope of the invention.

We claim:

A power plant comprising, in combination, a gas turbine engine, means defining an exhaust chamber receiving the exhaust from the engine, means defining a first constantly open outlet from the chamber of dimensions sufficient to handle the exhaust during idling operation of the engine, means defining a second outlet from the chamber substantially larger than the first outlet, the second outlet including valve means normally closed during idling operation of the engine and normally open at higher power levels, means responsive to pressure in the chamber operative to open the valve means in response to a predetermined pressure level above the level normal in idling operation of the engine; a power control for the engine operable to set the engine power output level, and means actuated by the power control operative to open the valve means when the power control is advanced above a predetermined power setting.

References Cited in the file of this patent

UNITED STATES PATENTS

| | | |
|---|---|---|
| 922,563 | Chadwick | May 25, 1909 |
| 1,368,453 | Ream | Feb. 15, 1921 |
| 1,483,354 | Kopper | Feb. 12, 1924 |
| 1,503,918 | Ruby | Aug. 5, 1924 |
| 1,695,554 | Markels | Dec. 18, 1928 |
| 1,761,960 | Armitage | June 3, 1930 |
| 2,421,838 | Harmon | June 10, 1947 |
| 2,631,427 | Rainbow | Mar. 17, 1953 |
| 2,852,912 | Kelley | Sept. 23, 1958 |
| 2,866,313 | Holl | Dec. 30, 1958 |
| 2,960,178 | De Lorean | Nov. 15, 1960 |

FOREIGN PATENTS

| | | |
|---|---|---|
| 446,914 | Great Britain | May 8, 1936 |